United States Patent [19]

Odermann et al.

[11] 4,199,712

[45] Apr. 22, 1980

[54] MOTOR CONTROL SYSTEM INCORPORATING DIGITAL TOP SPEED LIMITING ARRANGEMENT

[75] Inventors: Charles R. Odermann, Lake Valhalla; Jack Brown, Union, both of N.J.

[73] Assignee: The Singer Company, New York, N.Y.

[21] Appl. No.: 10,454

[22] Filed: Feb. 8, 1979

[51] Int. Cl.² ............................................... H02P 5/16
[52] U.S. Cl. ............... 318/345 E; 318/314; 318/327; 318/345 C
[58] Field of Search .......... 318/318, 314, 434, 345 G, 318/345 CA, 326, 327, 329, 345 C, 345 E, 341

[56] References Cited

U.S. PATENT DOCUMENTS

| | | | |
|---|---|---|---|
| 3,249,839 | 5/1966 | Fay | 318/345 C |
| 3,286,151 | 11/1956 | Dinger | 318/345 CA |
| 3,386,021 | 5/1968 | Fischer | 318/314 |
| 3,569,807 | 3/1971 | Ulrich | 318/434 |
| 3,601,677 | 8/1971 | McDavid | 318/345 C |

*Primary Examiner*—David Smith, Jr.
*Attorney, Agent, or Firm*—David L. Davis; Robert E. Smith; Edward L. Bell

[57] ABSTRACT

An SCR motor speed control system having a capacitor for triggering the SCR into conduction is provided with circuitry for limiting the top speed of the motor by sensing the time of a predetermined proportion of a motor revolution to determine the motor speed. When the time is below a predetermined time interval, indicative of motor speed above a desired top speed limit, a path is closed to bypass the charging path of the capacitor.

7 Claims, 6 Drawing Figures

4,199,712

MOTOR CONTROL SYSTEM INCORPORATING DIGITAL TOP SPEED LIMITING ARRANGEMENT

DESCRIPTION

BACKGROUND OF THE INVENTION

This invention relates to motor control systems and, more particularly, to a top speed limiting arrangement for incorporation in a DC motor control system.

Motor control systems are well known in the prior art for operating a DC motor from an AC supply at preselected speeds. Typically, such systems utilize phase control circuits connected between the DC motor and the cyclically varying AC power supply. A firing circuit is provided which responds to speed selection, typically via a potentiometer, for firing the phase control circuit at the appropriate phase angle of the power supply so as to control the motor speed. In particular, the phase control circuit typically includes a silicon controlled rectifier (SCR) serially connected betweeen the power supply and the motor and the firing circuit includes a charging capacitor connected to the gate electrode of the SCR so as to trigger the SCR upon reaching a predetermined voltage. Speed control is then attained by controlling the charging rate of the capacitor. Such systems typically further include some feedback from the motor for purposes of regulating the speed so that the selected speed is maintained irrespective of variations in line voltage and/or motor load.

Such prior art motor control systems commonly experienced difficulties in holding the maximum opeerating speed because of the many variables involved, i.e., variations in initial machine torques, changes in machine torque with time, variations in line voltages, etc. In certain applications, it is critical to keep the maximum motor speed below some upper limit. For example, in a sewing machine having electronic pattern control, the response time of the servo systems for the bight and feed actuators sets the upper limit on the speed of the sewing machine main drive motor.

It is therefore an object of this invention to provide a motor speed control system with an arrangement for limiting the top speed of the motor.

It is the further object of this invention to provide such an arrangement wherein desired speed settings below this upper limit are not affected.

SUMMARY OF THE INVENTION

The foregoing and additional objects are attained in accordance with the principles of this invention in a motor control system for operating a motor at preselected speeds and including means for connecting the system to a cyclically varying power supply, a phase control circuit connected between the motor and the power supply, and a firing circuit coupled to the phase control circuit for phase firing the phase control circuit to supply power to the motor during a portion of the cycle of the power supply, by providing means for limiting the top speed of the motor including means for providing a digital signal having value changes in predetermined timed relation to the rotation of the motor, and means responsive to the signal value changes being closer together than a predetermined time interval for preventing the firing circuit from operating.

BRIEF DESCRIPTION OF THE DRAWINGS

The foregoing will be more readily apparent upon reading the following description in conjunction with the drawings in which like reference numerals in different figures denote like elements and wherein.

DETAILED DESCRIPTION

Figure 1:
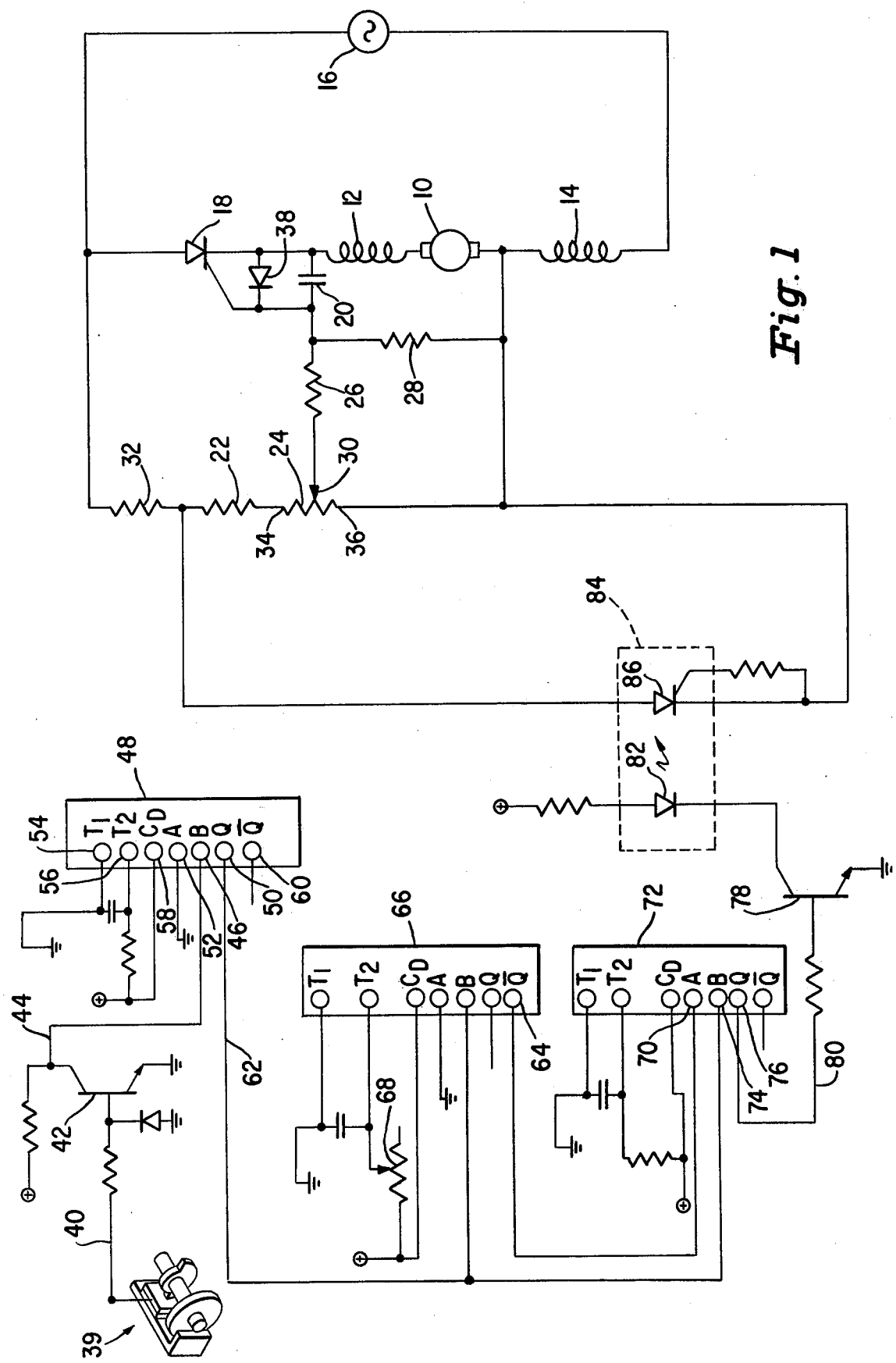
FIG. 1 is a schematic circuit diagram of a motor speed control system incorporating a first illustrative embodiment of an arrangement embodying the principles of this invention.

Referring now to FIG. 1, shown therein is a circuit for controlling the speed of a motor having an armature winding 10 and field windings 12 and 14. The motor windings are serially connected to a cyclically varying power supply 16 which may be commercially available 115 volt 60 hertz power. Serially interposed between the power supply 16 and the motor windings 10, 12 and 14 is a silicon controlled rectifier (SCR) 18. When triggered into conduction, the SCR 18 allows current to flow through the motor windings 10, 12 and 14 during the positive half cycles of the power supply 16.

To trigger the SCR 18 into conduction, there is provided a firing circuit which includes a charging capacitor 20 and a current control circuit comprising the resistors 22, 24, 26 and 28. The charging capacitor 20 is connected across the gate and cathode of the SCR 18 and, as is well known in the art, when the voltage across the charging capacitor 20 reaches a predetermined threshold level, the SCR 18 is triggered into conduction. Within a positive half cycle of the power supply 16, the sooner the voltage across the charging capacitor 20 reaches that predetermined threshold value, the sooner the SCR 18 is triggered into conduction and the more current flows through the motor windings 10, 12 and 14. Therefore, to increase the motor speed, the charging capacitor 20 is charged more quickly so that the SCR 18 is triggered earlier in the positive half cycle and to drive the motor slower, the capacitor 20 is charged at a slower rate so as to trigger the SCR 18 at a later point in the positive half cycle.

The rate at which the capacitor 20 is charged is determined by the setting of the tap 30 of the potentiometer 24. The charging path for the capacitor 20 is from the power supply 16, through the resistor 32, through the resistor 22, through the potentiometer 24, through the tap 30, through the resistor 26, through the capacitor 20, through the field winding 12, through the armature winding 10, through the field winding 14, and back to the power supply 16. Therefore, the closer that the tap 30 is to the end 34 of the potentiometer 24 the faster the charging rate of the capacitor 20 and the faster that the motor will run. Conversely, the closer that the tap 30 is to the end 36 of the potentiometer 24 the slower the charging rate of the capacitor 20 and the slower that the motor will run. During the negative half cycles of the power supply 16, the capacitor 20 discharges through the gate-cathode path of the SCR 18; through the resistor 28, the armature winding 10 and the field winding 12; and through the reverse path of the charging network. The diode 38 prevents excessive reverse voltage from appearing across the cathode-gate of the SCR 18.

The aforedescribed circuit is self regulating in that prior to the firing of the SCR 18, as the armature winding 10 rotates through the residual magnetic field set up by the field windings 12 and 14, a back EMF is generated in opposition to the capacitor charging path which is directly proportional to the speed of rotation of the armature winding 10. This voltage on the armature winding 10 prior to firing the SCR 18 bucks the flow of charging current to the capacitor 20 and causes a longer time to elapse before the voltage across the capacitor 20 reaches the firing voltage of the SCR 18. This automatically retards the firing angle, allowing the motor to reach a stable equilibrium speed. If a load is now applied to the motor, its speed tends to decrease, reducing the residual induced voltage in the armature winding 10 and automatically advancing the firing angle. This increases motor torque to handle the increased load and maintains motor speed essentially constant.

Although the aforedescribed circuit inherently sets the top speed of the motor for a given set of power supply parameters due to the values of the resistors 22–32, if the voltage of the power supply 16 should increase, the top speed of the motor would proportionally increase. As previously stated, this is undesirable. In accordance with the principles of this invention, there is provided circuitry for limiting the top speed of the motor independent of variations in voltage of the power supply. Further, this circuitry allows the motor speed control circuitry to function normally below this upper limit, by controlling the motor speed in accordance with the setting of the potentiometer 24.

The present invention operates in response to motor position signals which are utilized to determine the speed of the motor. In particular, the signals which are utilized provide an induction of the time it takes for the motor to rotate through a predetermined angle. In accordance with a first embodiment of this invention, a complete revolution of the motor is utilized for this purpose. In accordance with a second embodiment of this invention, a portion of a single revolution is utilized. It is understood that these embodiments are merely illustrative and that the scope of this invention is intended to be limited only by the scope of the appended claims.

Various sensors may be utilized to provide the position signals with which circuitry constructed in accordance with the principles of this invention may operate. Such sensors would typically be responsive to the rotation of a shaft connected to the motor. One such sensor is described in U.S. Pat. No. 3,939,372, the contents of which are hereby incorporated by reference. Such a sensor is a contact free electrical pulse generator that utilizes a Hall effect device and a permanent magnet to generate lines of flux and provides two stable output states when cooperating with a flux conducting cam having a stepped peripheral circumference mounted on a rotating shaft. The flux conducting cam enhances the flux density imposed upon the Hall effect device when the high portion of the cam becomes proximate the Hall device. The concentrated flux lines flowing through the Hall device changes the state of the device in accordance with the preselected anglular positions of the rotary shaft. The output of such a device is a two level (or state) signal wherein the proportionate period of time that the signal remains in either of the states during a single revolution of the shaft depends upon the relative angular proportions assumed by the high and low portions of the cam. This output signal is thus a square wave, the frequency of which is a function of the speed of rotation of the shaft on which the sensor assembly is mounted.

Referring again to FIG. 1, the output signal from the sensor assembly 39 is provided on the lead 40. Illustratively, the bias voltages for the sensor assembly 39 are set up so that the signal on the lead 40 is positive for part of a revolution of the shaft connected to the motor 10 and is negative for the remainder of the revolution of the shaft. The signal on the lead 40 is coupled to the base of transistor 42 which transforms this signal and provides a digital signal on the lead 44 which is low (logical ZERO) when the signal on the lead 40 is positive and is high (logical ONE) when the signal on the lead 40 is negative. The digital signal on the lead 44 is coupled to the input 46 of the circuit 48. The circuit 48 is a retriggerable astable multivibrator (one-shot), illustratively a type MC14528, manufactured by Motorola. This circuit is characterized by providing a pulse on its Q output 50 only under two conditions. The first condition is with a ZERO on the A input 52 and the B input 46 changes state from a ONE to a ZERO. The second condition is when there is a ONE applied to the B input 46 and the signal on the A input 52 changes from a ZERO to a ONE. For the circuit 48, the A input 52 is connected to ground (ZERO) so that only the first condition applies. Thus, when the signal on the lead 44 changes from a ONE to a ZERO, a pulse is applied to the Q output 50. This pulse is a signal which remains at ONE for a time period determined by the values of the resistive and capacitive components connected to the terminals 54, 56 and 58 of the circuit 48, as defined by the manufacturer of the circuit. The signal at the $\overline{Q}$ output 60 is the logical complement of the signal at the Q output 50.

Figure 1A:
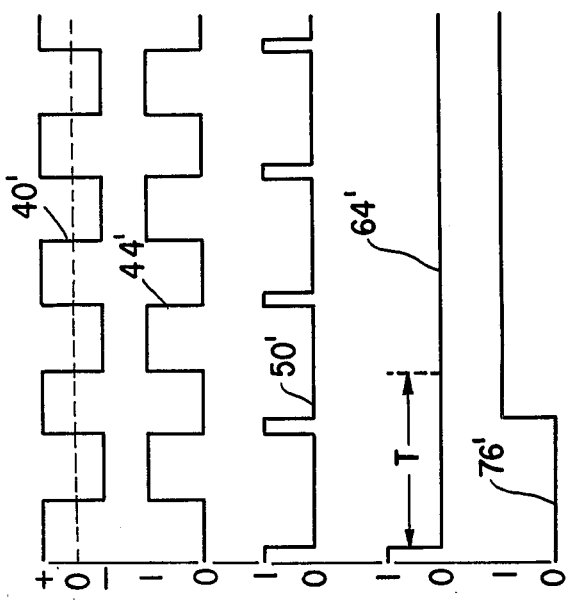
FIGS. 1A and 1B are timing charts useful in understanding the operation of the system shown in FIG. 1 for constant slow and fast speeds, respectively.
Figure 1B:
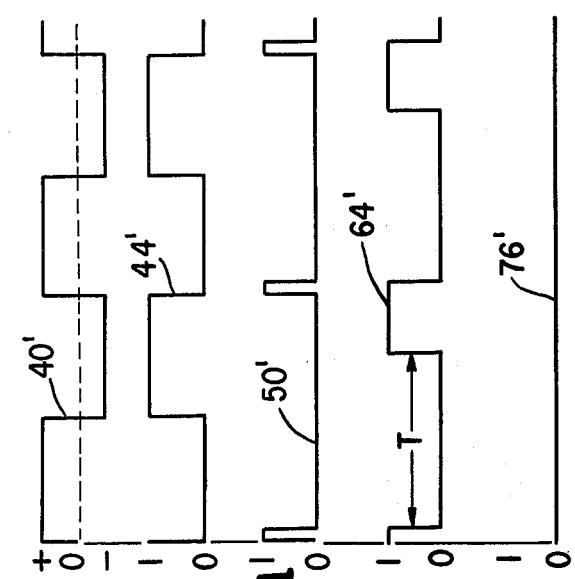

In summary, whenever the output of the sensor assembly on the lead 40 changes from negative to positive, a short ONE pulse is provided on the lead 62 from the Q output 50. This is illustrated on the timing charts of FIGS. 1A and 1B wherein the use of primed reference numerals is intended to refer to the signals on the corresponding unprimed terminals, or leads, in FIG. 1. (A corresponding relationship holds for FIGS. 2, 2A and 2B). The ONE pulse on the lead 62 from the Q output 50 of the circuit 48 will occur once per revolution of the sensor shaft. The time between pulses is used as a measure of the motor speed. This time is compared with the width of a reference ZERO pulse obtained at the $\overline{Q}$ output 64 of the circuit 66 which is, like the circuit 48, a retriggerable astable multivibrator. The multivibrator 66 is triggered by each pulse on the lead 62 to provide the reference ZERO pulse. The width T of this reference ZERO pulse is set by adjusting the trimpot 68. The $\overline{Q}$ output 64 of the multivibrator 66 is applied to the A input 70 of the circuit 72 and the timing pulse on the lead 62 is applied to the B input 74 of the circuit 72. The circuit 72, like the circuits 48 and 66, is a retriggerable astable multivibrator. If the time between pulses at the Q output 50, on the lead 62, is greater than the reference ZERO pulse width T on the $\overline{Q}$ output 64, which will occur at low motor speeds, the Q output 76 of the multivibrator 72 will remain at ZERO. This is shown in FIG. 1A. However, if the motor speed increases enough so that the time between pulses at the Q output 50 of the multivibrator 48 is less than the reference ZERO pulse width T at the Q̄ output 64 of the multivibrator 66, the first triggering condition of the multivibrator 72 will be satisfied and the Q output 76 of the multivibrator 72 will become high at a ONE. This is illustrated in FIG. 1B. So long as the speed is above this threshold, the multivibrators 66 and 72 will continue to be retriggered. By adjusting the trimpot 68, any desired top speed can be selected.

The Q output 76 of the multivibrator 72 is applied to the base of transistor 78 over the lead 80. A ONE signal on the lead 80 will cause the transistor 78 to turn on and allow current to flow through light emitting diode 82 which is part of an optoisolator circuit 84, illustratively a GE type H11Cl. This will turn on the optically coupled SCR 86 which applies a short circuit across the current control circuitry of the motor 10, preventing the capacitor 20 from charging and hence preventing the SCR 18 from firing, thus reducing the motor speed. However, when the motor is operated at lower speeds, the SCR 86 is nonconductive and normal motor control is unaffected.

FIGS. 1A and 1B illustrate constant slow and fast speed conditions, respectively. In actuality, the system will cycle between the slow and fast conditions. The timing of the multivibrator 72 is set above some predetermined time interval, illustratively the time of one revolution of the motor 10, so that the SCR 86 is conductive for at least this interval. (This is also the case for the system of FIG. 2).

Figure 2A:
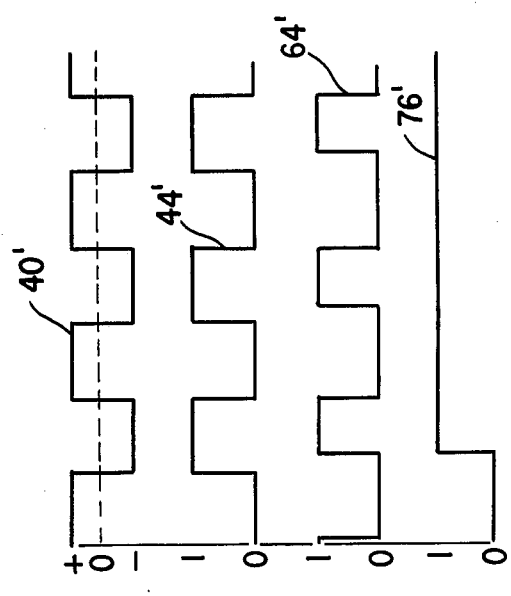
FIGS. 2A and 2B are timing charts useful in understanding the operation of the system shown in FIG. 2 for constant slow and fast speeds, respectively.
Figure 2B:
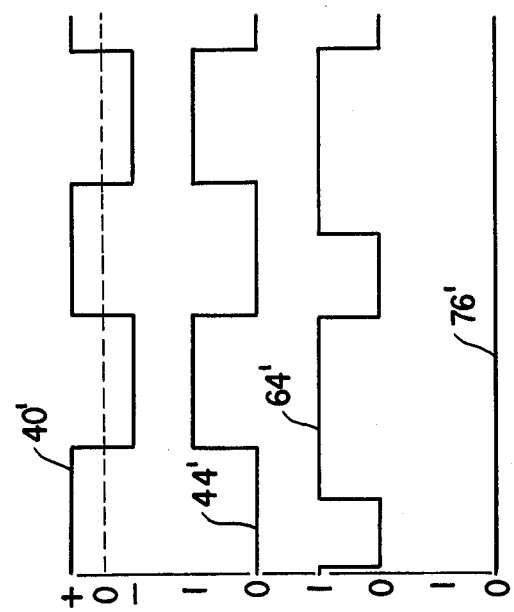
Figure 2:
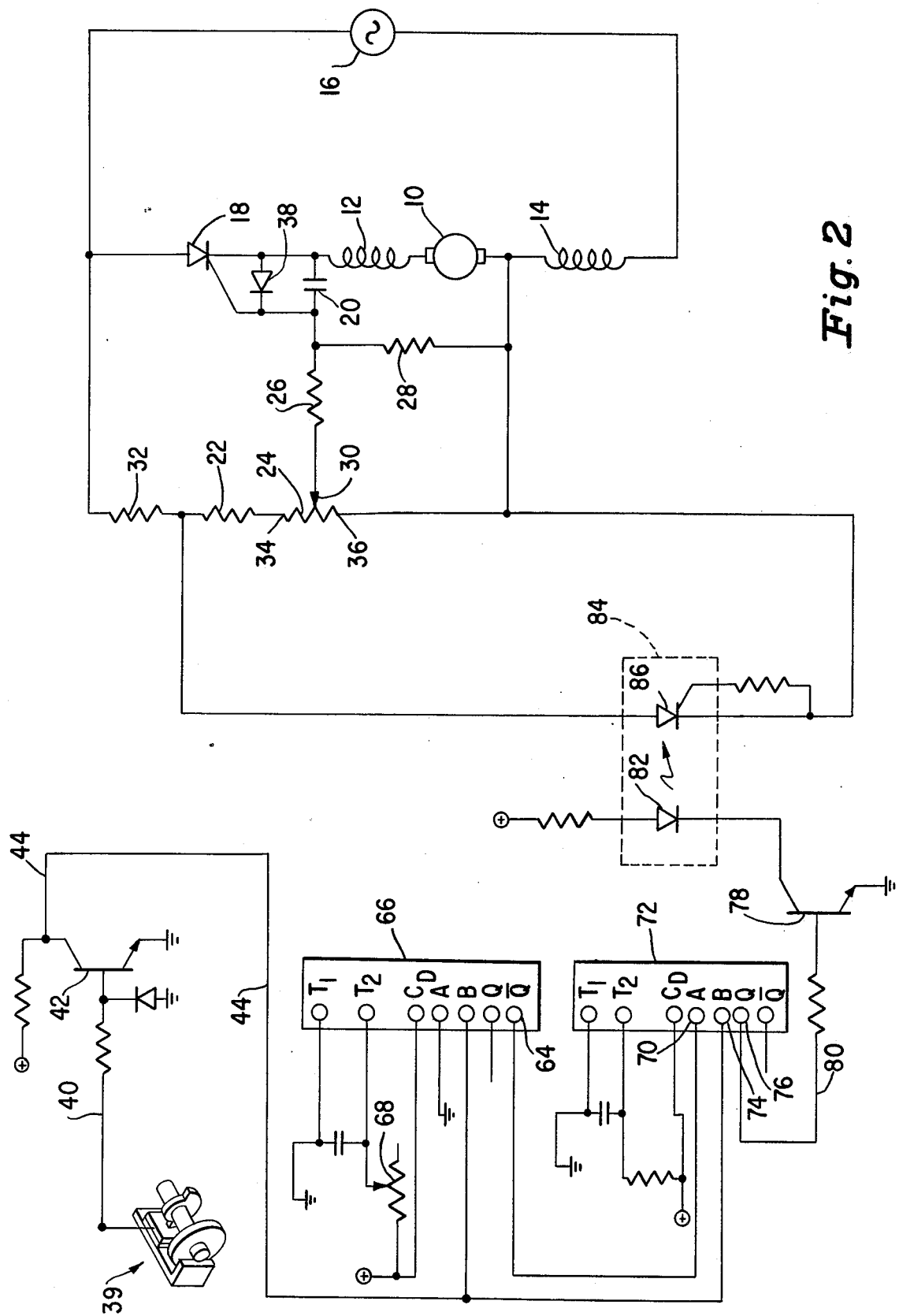
FIG. 2 is a schematic circuit diagram of a motor speed control system incorporating a second illustrative embodiment of an arrangement embodying the principles of this invention.

A second embodiment of this invention is illustrated in FIG. 2 wherein the multivibrator 48 is eliminated and the output of the transistor 42 on the lead 44 is connected directly to the multivibrators 66 and 72. The timing charts for this embodiment are shown in FIGS. 2A and 2B for constant slow and fast speeds, respectively. In this second embodiment, the motor speed is measured by the amount of time that the output of the sensor assembly over the lead 40 is positive, this time being a fixed proportion of the time for a complete revolution of the motor. The trimpot 68 is set so that the Q̄ output 64 measures the minimum allowable time that the signal on the lead 40 may be positive.

Accordingly, there have been disclosed digital arrangements for limiting the top speed of a motor. It is understood that the above-described embodiments are merely illustrative of the application of the principles of this invention. Numerous other embodiments may be devised by those skilled in the art without departing from the spirit and scope of this invention, as defined by the appended claims.

We claim:

1. A motor control system for operating a motor at preselected speeds and including means for connecting said system to a cyclically varying power supply, a phase control circuit connected between said motor and said power supply, and a firing circuit coupled to said phase control circuit for phase firing said phase control circuit to supply power to said motor during a portion of the cycle of said power supply,
wherein the improvement comprises means for limiting the top speed of said motor including:
means for providing a digital signal having value changes in predetermined timed relation to the rotation of said motor; and
means responsive to said signal value changes being closer together than a predetermined time interval for preventing said firing circuit from operating.

2. The motor control system according to claim 1 wherein said phase control circuit includes a silicon controlled rectifier, said firing circuit includes a charging capacitor connected across the gate and cathode of said silicon controlled rectifier and current control means connected in circuit with said charging capacitor for controlling the charging current supplied to said capacitor, the rate at which current is supplied to said charging capacitor controlling the motor speed by determining the point in each cycle of the power supply when said silicon controlled rectifier is fired, and said preventing means includes means for providing a path for bypassing said current control means.

3. The motor control system according to claim 1 wherein said preventing means includes:
a first retriggerable astable multivibrator for providing a first pulse in response to a predetermined value change of said digital signal;
a second retriggerable astable multivibrator for providing a second pulse of duration equal to said predetermined time interval in response to said first pulse;
a third retriggerable astable multivibrator responsive to the concurrence of said first and second pulses for providing an output signal; and
means responsive to said output signal for preventing said firing circuit from operating.

4. The motor control system according to claim 1 wherein said preventing means includes:
a first retriggerable astable multivibrator for providing a first pulse of duration equal to said predetermined time interval in response to a predetermined value change of said digital signal;
a second retriggerable astable multivibrator responsive to the termination of said first pulse after said digital signal has made a value change opposite said predetermined value change for providing an output signal; and
means responsive to said output signal for preventing said firing circuit from operating.

5. The motor control system according to claims 3 or 4 wherein said preventing means includes an optical isolator circuit having a light emitter diode input and a silicon controlled rectifier output having its anode and cathode connected across said current control means and means responsive to said output signal for supplying current to said light emitting diode input.

6. The motor control system according to claim 3 wherein said second retriggerable astable multivibrator includes means for varying said second pulse duration so as to provide a variable top speed limit for said motor.

7. The motor control system according to claim 4 wherein said first retriggerable astable multivibrator includes means for varying said first pulse duration so as to provide a variable top speed limit for said motor.

* * * * *